United States Patent [19]

Barrett et al.

[11] Patent Number: 5,136,692

[45] Date of Patent: Aug. 4, 1992

[54] MEMORY DISK BUFFER MANAGER

[75] Inventors: Gerald G. Barrett; Syed Z. Pasha; Amal A. Shaheen-Gouda, all of Austin, Tex.

[73] Assignee: International Business Machines Corporation, Armonk, N.Y.

[21] Appl. No.: 735,110

[22] Filed: Jul. 24, 1991

Related U.S. Application Data

[63] Continuation of Ser. No. 287,698, Dec. 20, 1988, abandoned, which is a continuation of Ser. No. 14,901, Feb. 13, 1987, abandoned.

[51] Int. Cl.$^5$ ............................................. G06F 13/00
[52] U.S. Cl. ..................................... 395/250; 395/425
[58] Field of Search ................. 364/200, 900; 395/250, 395/425

[56] References Cited

U.S. PATENT DOCUMENTS

| | | | |
|---|---|---|---|
| 4,246,637 | 1/1981 | Brown et al. | 364/200 |
| 4,399,503 | 8/1983 | Hawley | 364/200 |
| 4,437,155 | 3/1984 | Sawyer et al. | 364/200 |
| 4,489,378 | 12/1984 | Dixon et al. | 364/200 |
| 4,490,782 | 12/1984 | Dixon et al. | 364/200 |
| 4,530,055 | 6/1985 | Hamstra et al. | 364/200 |
| 4,648,033 | 3/1987 | Lewis et al. | 364/200 |
| 4,719,568 | 1/1988 | Carrubba et al. | 364/200 |

FOREIGN PATENT DOCUMENTS 0109309  11/1982  European Pat. Off. .

OTHER PUBLICATIONS

IBM Technical Disclosure Bulletin, vol. 24, No. 3, Aug., 1981, 1559-156; entitled "Improving Performance of Buffered DASD to which some References are Sequential".

IBM Technical Disclosure Bulletin, vol. 26, No. 3B, Aug., 1983, 1746-1747, entitled "Limited Replacement and Migration Controls".

*Primary Examiner*—Gary V. Harkcom
*Assistant Examiner*—Michael A. Jaffe
*Attorney, Agent, or Firm*—Thomas E. Tyson; Wayne P. Bailey

[57] ABSTRACT

A data processing system including at least one storage device for storing and retrieving data and connected to a storage device interface that controls the storing and retrieving of data from the storage device and further includes a data buffer for storing data retrieved from or being stored in the storage device. The data processing system includes a storage device driver that receives storage access commands from a processor, provides commands to the interface in response to these commands to the access commands from the processor and also provides commands for data not requested by the processor. The commands for data not requested by the processor provide for the temporary storage of data in the storage device interface data buffer. This data not requested by the processor is retrieved in anticipation of commands to be sent by the processor. The storage driver manages this buffer to optimize the amount of storage dedicated to the storage of data for these anticipatory commands.

15 Claims, 3 Drawing Sheets

MEMORY DISK BUFFER MANAGER

This is a continuation of application Ser. No. 07/287,698 filed Dec. 20, 1988 now abandoned, which is a continuation of application Ser. NO. 07/014,901 filed Feb. 13, 1987, now abandoned.

CROSS REFERENCE TO RELATED COPENDING APPLICATION

This application is related to copending U.S. patent application No. 014,902, filed Feb. 13, 1987, entitled "Memory Disk Accessing Apparatus".

TECHNICAL FIELD

This invention relates to the accessing of data from a mass memory storage device and specifically to the management of a buffer connected to the mass memory storage device.

BACKGROUND ART

Most data processing systems require mass memory storage facilities that store large amounts of data. One such mass memory device is a hard file or hard file. The hard file includes several surfaces having a magnetic coding for the magnetic storage of data. Data is stored and retrieved by moving a magnetic sensor or head over the surface. The surfaces are rotated at a high speed. Data is stored on the surfaces, in concentric channels termed tracks. Each track includes a series of sequentially located sectors that are addressable for the storage and retrieval of data. A head located above a track does not have to be moved to read or write data in sectors of that track since the rotation of the surface will eventually bring the sectors of this track into proximity with the head. When information is located on a different track, the head will have to be relocated over that track to read or write data into sectors of that track. The movement of this head is termed a seek operation.

Small data buffers have been used to interface to the hard file mass memory devices. The management of data in these buffers has traditionally followed a first-in first-out procedure. In other words, the data that has been input to the buffer at the first, the oldest data, is the data that is output the first. These buffers are used for both read and write operations to storage locations on the hard file. Another technique for managing data in such a buffer is the last-in first-out procedure. In the last-in first-out procedure the last data provided to the buffer is the first data that is output from the buffer.

It is the object of the present invention to provide a data buffer for interfacing to a mass memory storage device that includes a technique to optimize the storage of data which has not been specifically requested but is anticipated to be requested.

DISCLOSURE OF THE INVENTION

In accordance with the present invention, a data processing system is provided that includes at least one storage device for storing and retrieving data. This storage device is connected to a storage interface that controls the storing and retrieving of data from the storage device. The storage interfacing includes a data buffer for the temporary storing of data retrieved from or to be sent to the storage device. A storage driver is provided connected to the storage interface that receives storage device access commands from a processor. The storage driver provides read and write commands to the interface In response to the processor commands. The storage driver further includes the capability to provide commands for reading data that have not been requested by the processor. The storage driver then regulates the storage of this non-requested data in the interface data buffer.

In the preferred embodiment, a mass memory storage device is connected to an interface to control the storing or retrieving of information from the storage device. The storage interface includes a data buffer including a plurality of data blocks each for the storage of data in response to a command from the storage driver. The capacity of the data buffer includes enough memory to store data in response to all commands that can be processed by the interface for the storage devices connected and further to store data for the non-requested data commands from the storage driver.

The storage driver regulates the storage of data in the buffer by reserving blocks of the buffer in response to the access storage device access commands from the processor and in response to the non-requested data commands. Blocks reserved for data read from or written to the device as a response to a processor command stay reserved only while such command is being executed. Blocks reserved for non-requested data stay in this state till the data is requested by the processor or the block is reallocated by the device driver. The storage driver determines the length of time that data has been stored in blocks for the non-requested data commands. The driver then reallocates data buffer blocks in response to storage device access commands from the processor when there are no blocks available. This reallocation is accomplished by the storage driver determining which of the blocks having data stored in response to a non-requested data command have stored data for an age that exceeds a predetermined maximum age. If there are no data blocks with data stored for a time in excess of this maximum age, the system driver then allocates data blocks that have data stored in response to non-requested data commands that have the least length of storage time.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

The present invention relates to the management of a data buffer connected to several mass memory storage devices. In the preferred embodiment the data buffer is contained in an interface connected to three hard file disks. The interface responds to a storage driver program contained in the system processor that provides commands for storing and retrieving data from these hard disks. The data retrieved and sent to the hard disks is temporarily stored in the data buffer. This storage driver includes the capability to anticipate read commands from the system. Special read commands are issued in response to this anticipation. These read commands are termed "read ahead" commands and cause data to be read from the hard disks and stored in the data buffer. Normal read and write commands also cause data to be stored in the buffer but the data is then input immediately into the system memory or the hard file. The read ahead data however continues to be stored until an actual read command is received. A discussion of the apparatus for providing this anticipatory capability is disclosed in the copending U.S. patent application No. 014,902, filed Feb. 13, 1987, now abandoned entitled "Memory Disk Accessing Apparatus".

This invention optimally manages the storing of read ahead data in this buffer.

Figure 1:
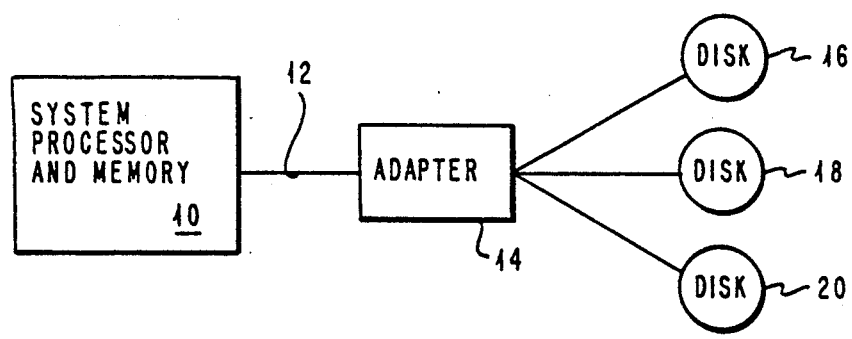
FIG. 1 is a block diagram of a data processing system including the invention.

FIG. 1 is a block diagram of a data processing system. The system processor in memory 10 is connected via a bus 12 to an adapter interface 14. The adapter interface is connected to three hard files 16, 18, and 20.

Figure 2:
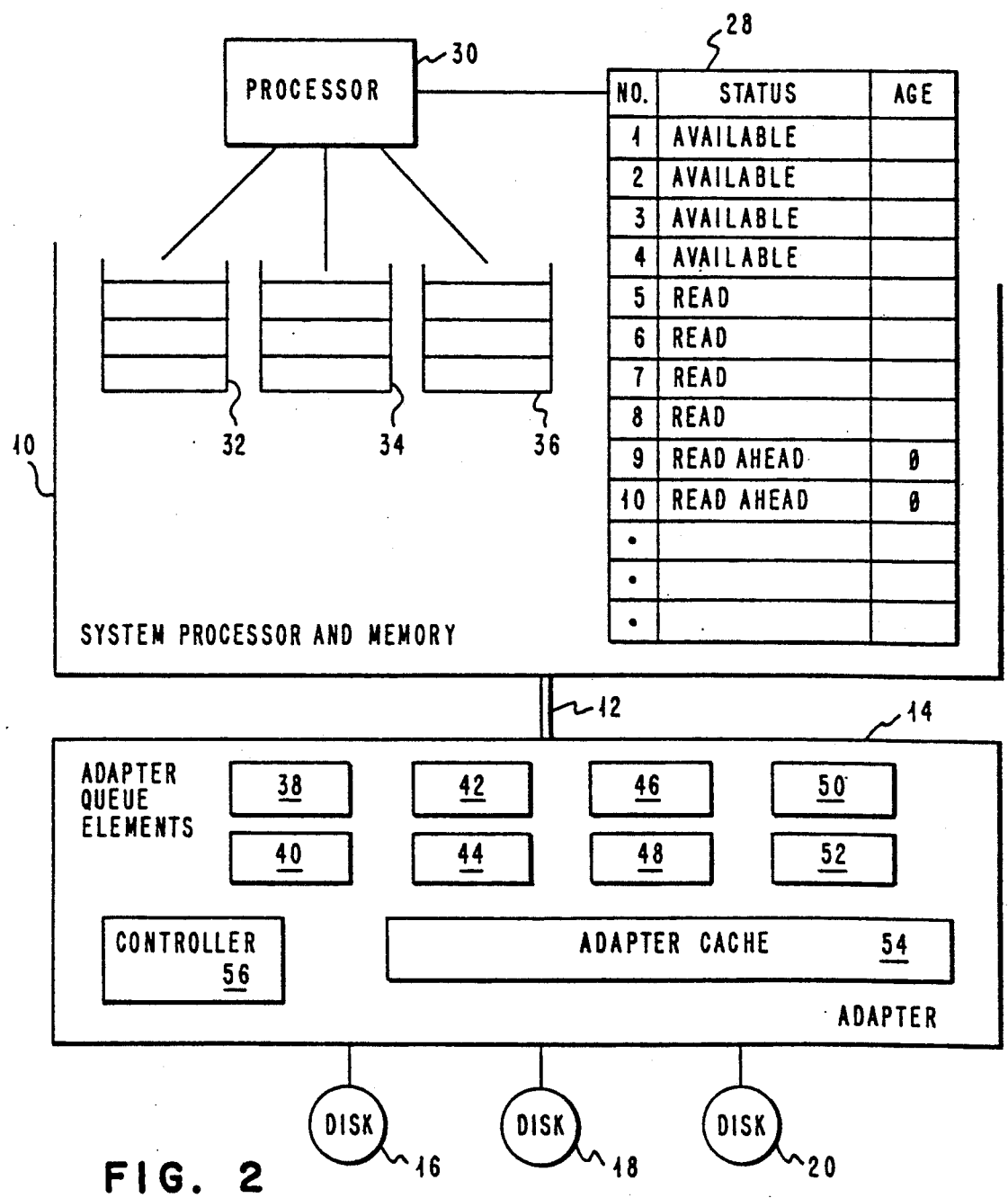
FIG. 2 is a block diagram illustrating the data structure used by the system driver and the interface adapter.

FIG. 2 illustrates in symbolic form the storage driver software that is executed in processor 30 and that controls dequeueing requests from three command queues 32, 34 and 36. The command queues 32, 34 and 36 correspond to disk 16, 18 and 30, respectively. These command queues store read and write commands from applications software being executed in the processor 30. The storage driver being executed in processor 30 also controls a table 28 that includes the status of the data in a buffer. The adapter 14 is connected via an I/O bus 12 to the system processor and memory 10. This adapter 14 includes an adapter cache 54. The adapter 14 further includes several adapter queue elements 38, 40, 42, 44, 46, 48, 50 and 52. Adapter queue elements 38 and 40 are dedicated to disk 16. Likewise, adapter queue elements 42 and 44 are dedicated to disk 18 and adapter queue elements 46 and 48 are dedicated to disk 20. Adapter queue elements 50 and 52 are dedicated for commands to manage the cache 54. The adapter 14 further includes a controller 56 that responds to commands from the storage driver in the system processor and memory 10.

In the preferred embodiment the cache 54 is a 16 kbyte RAM that is divided into 32 blocks of 512 bytes each. The table 28 in the system processor memory 10 includes the status of each one of these blocks. The device driver executing in processor 30 issues four types of commands. The first two, read and write, are issued in response to storage device access commands from applications programs running in processor 30. In response to these commands, the device driver provides the read and write commands to the adapter 14. These commands are stored in the adapter queue elements such as 38 and 40. If the command is a write command, the data for the write command is stored in a data block in cache 54 until it is ready to be written to the appropriate hard file. If the command is a read command, the data read from the hard file is temporarily stored in a data block in the cache 54. The device driver in processor 30 further provides a read ahead command that is an anticipatory command anticipating the future read command for a certain block of data. The issuance of the read ahead commands as discussed in detail in the copending U.S. Patent Application referenced above.

Data that is read in response to the read ahead commands are also stored in the adapter cache 54. Optimally this data remains in cache 54 until a read command for that data is received by the system driver. When such a command is received the system driver and processor 30 provides a read cache command that is stored in adapter queue elements 50 or 52 in the adapter 14. The data is thus read from cache 54 directly without having to access the disk and sent immediately to the system processor and memory 10.

Obviously if enough read ahead commands are executed and the data for these read ahead commands application software in processor 30, the cache 54 will fill up with this data and not have room for data for read and write commands from the processor. Additionally no other read ahead commands can be executed. The present invention provides a solution to this problem by managing the data contained in the cache. The system driver executing in processor 13 maintains a record represented by table 28 that details the status of each of the blocks in the adapter cache 54. In addition, if the block contains data stored in response to a read ahead command, the device driver in processor 30 maintains a number indicative of how long this data has been stored in cache 54.

Figure 3:
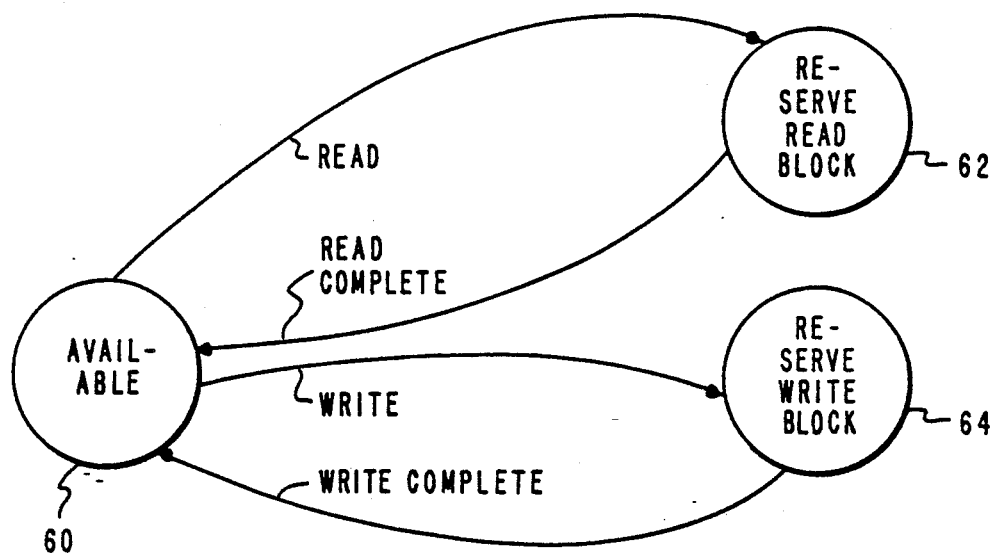
FIG. 3 is a state diagram for the interface data buffer for read and write operations.

FIG. 3 is a simplified state flow diagram illustrating the management of data blocks in the cache 54 for read and write commands from the system driver in the processor 30. In FIG. 3, a data block is available, state 60, until it is reserved by the driver in processor 30 when a read command is received. At that point the system driver in processor 30 then reserves the data block for storage of the data received from the disk read, state 62. The block is made available again by the system driver in processor 30 when the read operation is completed by the transmission of the data from the data block in cache 54 to processor 30. In the preferred embodiment this is normally a direct memory access (DMA) transfer. Therefore, the status of the data block in cache 54 returns to state 60 and is available. Likewise, when a write command is executed, the write data must be stored in the data block in cache 54. Therefore, the system driver in processor 30 reserves a block in cache 54 as illustrated by state 64. When the write command is completed, the system driver in processor 30 then makes this data block available. Referring to FIG. 2, the system driver in processor 30 maintains a record of each of the data block and the status of that data block as illustrated by table 28.

FIG. 3 is complete as it addresses read and write commands from the system driver in processor 30. However, the state diagram in FIG. 3 does not address the read ahead commands or read cache commands. These commands are discussed in detail in the software flow diagrams of FIGS. 4 and 5.

Figure 4:
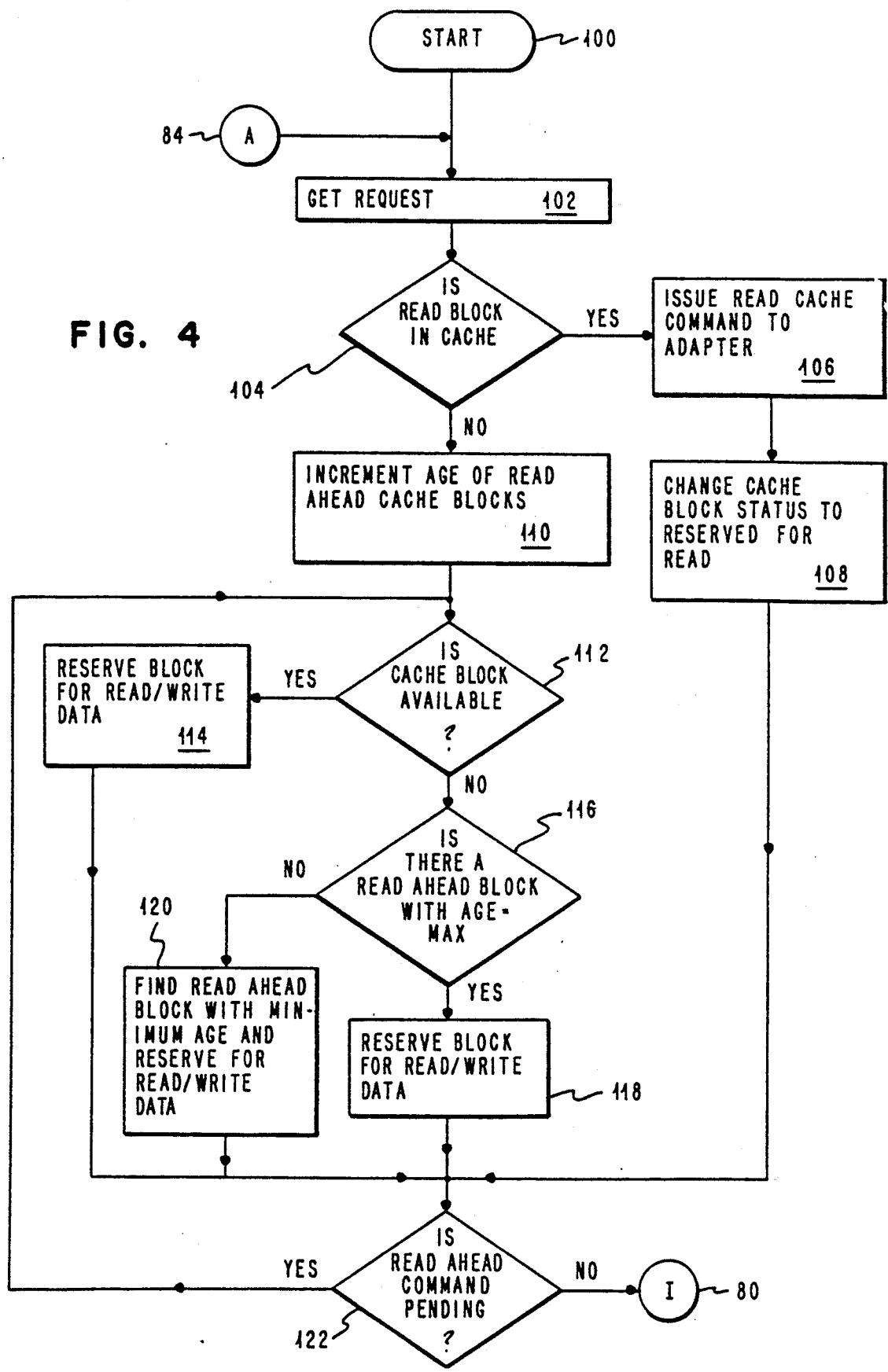
FIG. 4 is a flow chart illustrating the system driver procedures for managing the interface adapter cache.

FIG. 4 illustrates a software flow chart for the procedures in the system driver in processor 30 for managing cache 54 in adapter 14. The software flow starts at 100 and proceeds to step 102. In step 102 the system driver in processor 30 receives a request to either read or write data to one of the mask memory storage device disk 16, 18 or 20. In step 104, the system driver in processor 30 determines if the request is to read a block of data that has been previously stored in cache 54 as of the result of a read ahead command. If so, the driver proceeds to step 106 to issue a read cache command to read the specific block in cache 54. The driver proceeds to step 108 to change the cache block status (Table 28 in FIG.

2) to be reserved for a read. The driver then proceeds to step 122 that will be discussed later.

Returning to step 104, if the request from the application software in processor 30 is not for a block to be read that is in cache 54, then the driver proceeds to step 110 to increment the age of all read ahead blocks stored in cache 54. The system driver then proceeds to step 112 to determine if the cache block is available. If so, in step 114, the driver reserves a block for either the read command or write command data. The driver then proceeds to step 122 to be discussed later.

Returning to step 112, if a cache block is not available in cache 54, the driver proceeds to step 116 to determine if there is a block storing read ahead data having an age that is equal to the maximum age. In the preferred embodiment the maximum age number is 5. If so, the driver proceeds to step 118 to reserve that block (i.e., the block with the maximum age) for the read/write data. If there is more than one block having a maximum age, the last block to reach maximum age is used. The driver then proceeds to step 122. Returning to step 116, if there are no read ahead blocks with maximum age, the driver proceeds to step 120 to find the data block in cache 54 that is storing data for a read ahead command that has the minimum age. The driver then reserves this block for the read/write data. The driver then proceeds to step 122.

In step 122, the driver determines if there is a read ahead command pending. If so, the driver then returns to step 112. If not, the driver proceeds to the software illustrated in flow chart form in FIG. 5 through connector 80.

Figure 5:
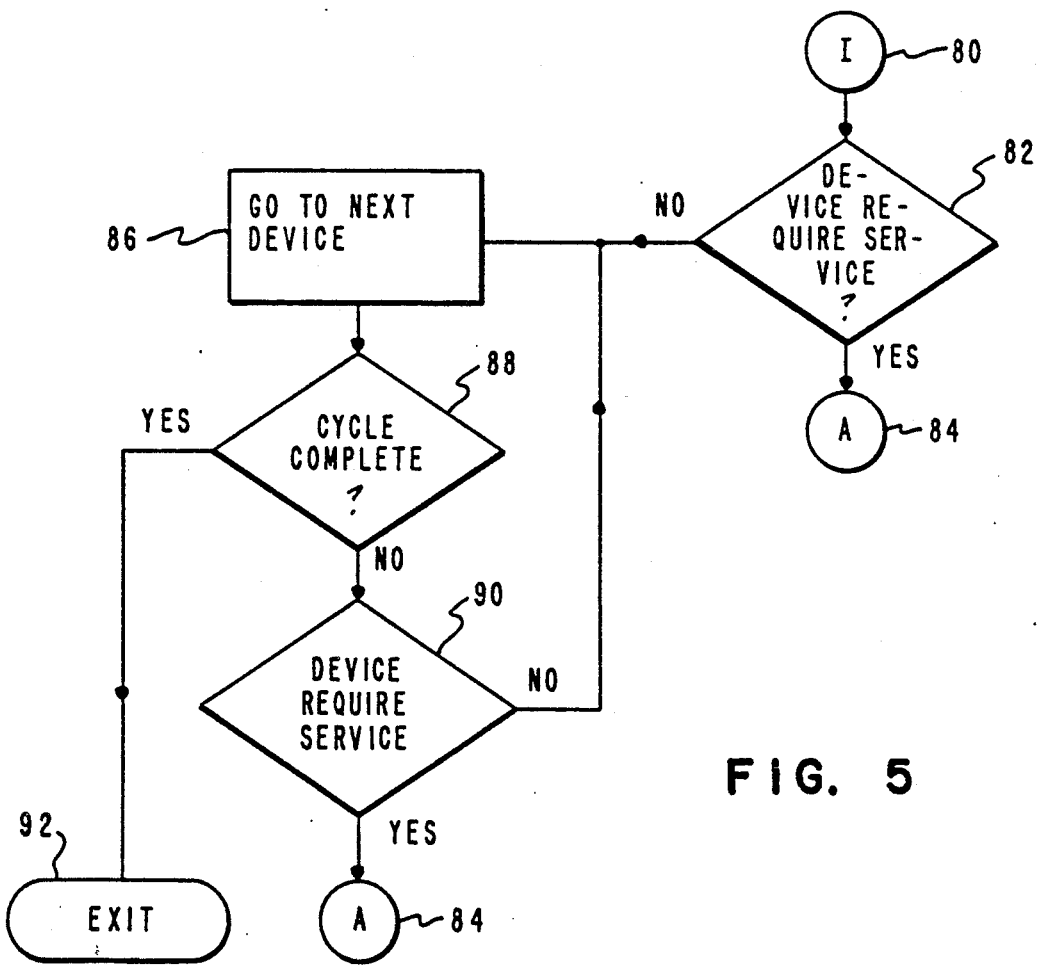
FIG. 5 is a flow chart illustrating the storage driver procedures for servicing different storage devices.

In FIG. 5, the driver proceeds to step 82 to determine if the present device needs further service, i.e., are there other read or write commands to be processed. If so, the driver proceeds to step 104 (FIG. 4) through connector 84. Returning to step 82, if this present device does not need any further service, the driver proceeds to step 86 to go to the next device. In step 88, the driver determines if the service cycle has been completed. If all devices have been accessed and none of the devices have required service, then the service cycle is complete. If any one device, however, requires service, the driver must again start servicing all devices until all devices have been queried and none of the devices require service. If the cycle is complete and none of the devices have required service through a cycle, the driver then exits through connector 92 and returns to the applications software being executed in processor 30. If not, the driver proceeds to step 90 to determine if this device now needs service. If not, the driver returns to step 86 to increment the device counter and go to the next device. If the current device in step 90 does require service, then the driver proceeds through connector 84 to step 102 (FIG. 4).

Although the invention has been described with reference to this specific embodiment, this description is not meant to be construed in a limiting sense. Various modification of the disclosed embodiment, as well as other embodiments of the invention, will become apparent to those persons skilled in the art upon reference to the description of this invention. It is, therefore, contemplated that the appended claims will cover any such modifications or embodiments as fall within the true scope of the invention.

We claim:

1. A data processing system comprising:
    at least one storage means for storing and retrieving data;
    a storage interface means for controlling the storing and retrieving of data from said storage means and including a data buffer means for storing data retrieved from or to be stored in said storage means, said data buffer means further including a plurality of data blocks each for the storage of data from the storage means in response to one command from a storage driver means; and
    said storage driver means for receiving storage means access commands from a processor, for providing requested data commands to said storage interface means in response thereto and including means for providing nonrequested data commands for data not requested by said processor from said storage means, and for storing requested data in said data buffer means until said requested data has been accessed by said processor and storing nonrequested data in said data buffer means until either the nonrequested data is accessed by said processor or until a location storing the nonrequested data is needed for storing data from a subsequent command for requested or nonrequested data, and said storage driver means further including means for regulating storage of data in said buffer means by reserving said blocks for data in response to said storage means access commands and said commands for nonrequested data means and including means for determining how many commands for requested data have been received while each nonrequested data has been stored in said data blocks in response to said nonrequested data commands.

2. A data processing system according to claim 1 wherein said storage driver means includes means for designating a data block to store data in response to a storage means access command from said processor when the data block previously stored data in response to a nonrequested data command and the number of commands for requested data that have been received while that previously stored data has been stored exceeds a predetermined number.

3. A data processing system according to claim 2 wherein said storage driver means includes means for designating a data block to store requested data in response to a storage means access command from said processor (1) when the designated block previously stored nonrequested data in response to a nonrequested data command, (2) when a number of commands for requested data received during storage of the nonrequested data in the designated data block is less than a number of commands for requested data received during storage of nonrequested data in each of all other data blocks storing nonrequested data, and (3) when one of the remaining blocks storing nonrequested data have had their respective nonrequested data stored for a period during which a number of commands for requested data received has exceeded the predetermined number.

4. A data processing system comprising:
    at least one storage means for storing and retrieving data from a plurality of moving tracks each including sequentially located sectors for the storage of data;
    a storage interface means for controlling the storing and retrieving of data from said storage means and including a data buffer means for storing data retrieved from or to be stored in said storage means and said data buffer means including a plurality of data blocks each for the storage of data from sectors of the storage means in response to one command from a storage driver means; and said storage driver means for receiving storage means access commands from a processor, for providing requested data commands to said storage interface means in response thereto and including means for providing nonrequested data commands for data not requested by said processor from said storage means, and for storing said requested data in said data buffer means until said requested data has been accessed by said processor and storing nonrequested data in said data buffer means until either the nonrequested data is accessed by said processor or until a location storing the nonrequested data is needed for storing data from a subsequent command for requested or nonrequested data, and said storage driver means further including means for regulating storage of data in said buffer means by reserving said blocks for data in response to said storage means access commands and said commands for nonrequested data and including means for determining how many commands for requested data have been received while each nonrequested data has been stored in said data blocks in response to said nonrequested data commands.

5. A data processing system according to claim 4 wherein said storage driver means includes means for designating a data block to store data in response to a storage means access command from said processor when the data block previously stored data in response to a nonrequested data command and number of commands for requested data that have been received while that previously stored data has been stored exceeds a predetermined number.

6. A data processing system according to claim 5 wherein said storage driver means includes means for designating a data block to store requested data in response to a storage means access command from said processor (1) when the designated block previously stored nonrequested data in response to a nonrequested data command, (2) when a number of commands for requested data received during storage of the nonrequested data in the designated data block is less than a number of commands for requested data received during storage of nonrequested data in each of all other data blocks storing nonrequested data, and (3) when none of the remaining blocks storing nonrequested data have had their respective nonrequested data stored for a period during which a number of commands for requested data received has exceeded the predetermined number.

7. A data processing system according to claim 6 wherein said means for providing nonrequested data commands provides such commands for data located in sectors adjacent to sectors storing said data retrieved in response to commands for requested data in one of said storage means.

8. A data processing system comprising:
at least one storage means for storing and retrieving data;
a storage interface means for controlling the storing and retrieving of data from said storage means and including a data buffer means for storing data retrieved from or to be stored in said storage means and further including a buffer directory containing information indicating locations storing data and locations available for storing data; and a storage driver means for receiving storage means access commands from a processor, for providing requested data commands to said storage interface means in response thereto and including means for providing nonrequested data commands for data not requested by said processor from said storage means, and for regulating the storage of data in said data buffer means according to said buffer directory by (1) storing either requested or nonrequested data in available locations indicated by said buffer directory information and changing the buffer directory information to indicate such storage, (2) for requested data, changing such buffer directory information to indicate location availability when said requested data has been accessed by said processor, and (3) for nonrequested data, changing such buffer directory information to indicate location availability when either the nonrequested data is accessed by said processor or when a location storing the nonrequested data has been stored in said data blocks in response to said nonrequested data commands, and wherein said data buffer means includes a plurality of data blocks each for storage of data from the storage means in response to one command from the storage driver means and said storage driver means further including means for regulating storage of data in said buffer means by reserving said blocks for data in response to said storage means access commands and said commands for nonrequested data.

9. A data processing system according to claim 8 wherein said storage driver means includes means for designating a data block to store data in response to a storage means access command from said processor when the data block previously stored data in response to a nonrequested data command and the number of commands for requested data that have been received while that previously stored data has been stored exceeds a predetermined number.

10. A data processing system comprising:
at least one storage means for storing and retrieving data from a plurality of moving tracks each including sequentially located sectors for the storage of data;
a storage interface means for controlling the storing and retrieving of data from said storage means and including a data buffer means for storing data retrieved from or to be stored in said storage means and further including a buffer directory containing information indicating locations storing data and locations available for storing data; and
a storage driver means for receiving storage means access commands from a processor, for providing requested data commands to said storage interface means in response thereto and including means for providing nonrequested data commands for data not requested by said processor from said storage means, and for regulating the storage of data in said data buffer means according to said buffer directory by (1) storing either requested or nonrequested data in available locations indicated by said buffer directory information and changing the buffer directory information to indicate such storage, (2) for requested data, changing such buffer directory information to indicate location availability when either the nonrequested data is accessed by said processor or when a location storing the nonrequested data is needed for storing data from a subsequent command for requested or nonrequested data, said storage driver means further including means for determining how many commands for requested data have been received while each nonrequested data has been stored in said data blocks in response to said nonrequested data commands, and wherein said data buffer means includes a plurality of data blocks each for storage of data from sectors of the storage means in response to one command from the storage driver means and said storage driver means further including means for regulating storage of data in said buffer means by reserving said blocks for data in response to said storage means access commands and said commands for nonrequested data.

11. A data processing system according to claim 10 wherein said storage driver means includes means for designating a data block to store data in response to a storage means access command from said processor when the data block previously stored data in response to a nonrequested data command and number of commands for requested data that have been received while that previously stored data has been stored exceeds a predetermined number.

12. A data processing system according to claim 11 wherein said means for providing nonrequested data commands provides such commands for data located in sectors adjacent to sectors storing said data retrieved in response to commands for requested data in one of said storage means.

13. A data processing system according to claim 12 wherein said storage driver means includes means for designating a data block to store requested data in response to a storage means access command from said processor (1) when the designated block previously stored nonrequested data in response to a nonrequested data command, (2) when a number of commands for requested data received during storage of the nonrequested data in the designated data received during storage of nonrequested data in each of all other data blocks storing nonrequested data, and (3) when none of the remaining blocks storing nonrequested data have had their respective nonrequested data stored for a period during which a number of commands for requested data received has exceeded the predetermined number.

14. A data processing system according to claim 13 wherein said storage driver means includes means for designating a data block to store requested data in response to a storage means access command from said processor (1) when the designated block previously stored nonrequested data in response to a nonrequested data command, (2) when a number of commands for requested data received during storage of the nonrequested data in the designated data block is less than a number of commands for requested data received during storage of nonrequested data, and (3) when none of the remaining blocks storing nonrequested data have had their respective nonrequested data stored for a period during which a number of commands for requested data received has exceeded the predetermined number.

15. In a data processing system including at least one storage device that stores and retrieves data, a storage interface that controls the storing and retrieving of data in the storage device and including a data buffer that stores data retrieved from or to be stored in the storage device, the data buffer further including a plurality of data blocks each for the storage of data from the storage device in response to a command from a storage driver circuit, a method comprising the steps of:
  receiving storage device access commands from a processor in the storage driver;
  providing requested data commands to the storage interface in response to the receiving of the storage means access commands;
  providing nonrequested data commands for data not requested by the processor;
  storing requested data in the data buffer until the requested data has been accessed by the processor;
  storing nonrequested data in the data buffer means until either the nonrequested data is accessed by the processor or until a location storing the nonrequested data is needed for storing data from a subsequent command for either requested or nonrequested data;
  regulating storage of data in said buffer means by reserving the blocks for data in response to the storage means access commands and the commands for nonrequested data; and
  determining how many commands for requested data have been received while each nonrequested data has been stored in the data blocks in response to the nonrequested data commands.

* * * * *

UNITED STATES PATENT AND TRADEMARK OFFICE
CERTIFICATE OF CORRECTION

PATENT NO. : 5,136,692                                 Page 1 of 2

DATED : Aug. 4, 1992

INVENTOR(S) : Gerald G. Barrett et al

It is certified that error appears in the above-identified patent and that said Letters Patent is hereby corrected as shown below:

Col. 4, line 12, after "commands" insert --are not immediately accessed by read commands from the--;

Col. 8, line 22, after "data" insert --is needed for storing data from a subsequent command for requested or nonrequested data, said storage driver means further including means for determining how many commands for requested data have been received while each nonrequested data--;

line 68, after "when" insert --said requested data has been accessed by said processor, and (3) for nonrequested data, changing such buffer directory information to indicate location availability when--;

UNITED STATES PATENT AND TRADEMARK OFFICE
CERTIFICATE OF CORRECTION

PATENT NO. : 5,136,692

DATED : August 4, 1992

INVENTOR(S) : Gerald G. Barrett, et al

It is certified that error appears in the above-indentified patent and that said Letters Patent is hereby corrected as shown below:

Col. 9, line 41, after "data"(second occurrence) insert --block is less than a number of commands for requested data--; and Col. 10, line 11, after "data" insert --in each of all other data blocks storing nonrequested data --.

Signed and Sealed this

Twenty-fourth Day of October, 1995

Attest:

BRUCE LEHMAN

*Attesting Officer*  *Commissioner of Patents and Trademarks*